(12) United States Patent
Ma

(10) Patent No.: US 12,160,539 B1
(45) Date of Patent: Dec. 3, 2024

(54) AUXILIARY SHOOTING DEVICE FOR MOBILE DEVICE

(71) Applicant: Qiaohua Ma, Puning (CN)

(72) Inventor: Qiaohua Ma, Puning (CN)

( * ) Notice: Subject to any disclaimer, the term of this patent is extended or adjusted under 35 U.S.C. 154(b) by 0 days.

(21) Appl. No.: 18/797,968

(22) Filed: Aug. 8, 2024

(30) Foreign Application Priority Data

Jul. 19, 2024 (CN) .......................... 202421721030.7

(51) Int. Cl.
  *H04M 1/00* (2006.01)
  *H04M 1/21* (2006.01)

(52) U.S. Cl.
  CPC .................................... *H04M 1/21* (2013.01)

(58) Field of Classification Search
  CPC .... H04M 1/21; H04M 1/0235; H04M 1/0249; H04M 1/0254; H04M 1/026; H04M 1/0264
  See application file for complete search history.

(56) References Cited

U.S. PATENT DOCUMENTS

| | | | |
|---|---|---|---|
| 9,020,301 B2* | 4/2015 | Morris ................. | G01S 7/4808 382/293 |
| 11,429,012 B2* | 8/2022 | Holland ................. | H04N 5/222 |
| 2022/0193892 A1* | 6/2022 | Altaras ................. | H04N 23/61 |

\* cited by examiner

*Primary Examiner* — Tuan Pham
(74) *Attorney, Agent, or Firm* — Daniel M. Cohn

(57) ABSTRACT

An auxiliary shooting device for a mobile device includes a telescopic rod, a connecting base, a connecting bracket and a locking switch assembly. The telescopic rod includes a handheld portion. The connecting base is connected to one end of the telescopic rod away from the handheld portion. The connecting bracket includes locking grooves and a clamping portion for clamping the mobile device. The locking switch assembly includes elastic retaining pieces and locking pieces. The locking pieces are rotatably connected to the connecting base. Each of the locking pieces includes a pressing portion and a hook portion. When each pressing portion is pressed, each of the elastic retaining pieces is compressed, and each hook portion moves away from the connecting base. The locking pieces are matched with the locking grooves of the connecting bracket. The elastic retaining pieces respectively abut against the locking pieces and the connecting base.

10 Claims, 8 Drawing Sheets

AUXILIARY SHOOTING DEVICE FOR MOBILE DEVICE

TECHNICAL FIELD

The present disclosure relates to a technical field of photographic and video camera devices, and in particular to an auxiliary shooting device for a mobile device.

BACKGROUND

Mobile devices, such as mobile phones, are not as professional as cameras and sports cameras in photography, but the mobile phones basically meet shooting needs of ordinary users. Many ordinary users also use selfie sticks as auxiliary shooting devices to adjust a shooting distance and a shooting angle. In addition, the selfie sticks are also used as shooting brackets.

Conventional shooting brackets are commonly elastic clamps, which adopt a principle of elastic expansion and retraction to clamp a mobile phone of a user. If a conventional selfie stick is in an extended state, when the user needs to browse shooting contents after taking photos or videos, in order not to affect others, the conventional selfie stick needs to be retracted first, and then the user holds an elastic clamp thereof and the mobile phone to browse the shooting contents. If the user is not satisfied with the shooting contents and needs to reshoot, the user needs to pull the conventional selfie stick out again and then shoot again. Alternatively, the user is also able to take the mobile phone out of the elastic clamp instead of retracting the selfie stick. In order not to affect others, the user needs to place the conventional selfie stick vertically. If the user is not satisfied with the shooting contents and needs to reshoot, the user needs to place the mobile phone into the elastic clamp and then shoot. In this process, an operation of mounting the mobile phone on the elastic clamp and separating the mobile phone from the elastic clamp is time-consuming and inconvenient, resulting in a poor user experience.

It is obvious that the conventional selfie stick is unable to well support the use in browsing the shooting contents and switching the mobile phone back to a shooting state after browsing.

SUMMARY

In view of defects in the prior art, the present disclosure provides an auxiliary shooting device for a mobile device to solve technical problems in the prior art.

To achieve the above object, in a first aspect, the present disclosure provides the auxiliary shooting device for the mobile device. The auxiliary shooting device comprises a telescopic rod, a connecting base, a connecting bracket, a locking switch assembly, a magnetic positioning assembly, and an adapter base. The connecting base is alternatively connected to the connecting bracket and the adapter base. The telescopic rod comprises a handheld portion. The connecting base is connected to one end of the telescopic rod away from the handheld portion. The connecting bracket comprises locking grooves and a clamping portion configured to clamp the mobile device. The locking switch assembly comprises elastic retaining pieces and locking pieces rotatably connected to the connecting base. Each of the locking pieces comprises a pressing portion and a hook portion. When each pressing portion is pressed, each of the elastic retaining pieces is compressed, and the hook portion of each of the locking pieces moves away from the connecting base.

The locking pieces are respectively matched with the locking grooves of the connecting bracket. A first end of each of the elastic retaining pieces abuts against a corresponding one of the locking pieces. A second end of each of the elastic retaining pieces abuts against the connecting base. The connecting base and the connecting bracket are connected and locked with each other through the locking grooves of the connecting bracket and the locking pieces. The adapter base comprises a connecting piece, an accommodating portion, and locking grooves. The connecting piece comprises a 4/1 screw and a rotating wheel. The 4/1 screw extends out of an upper end surface of the adapter base. The rotating wheel is disposed in the accommodating portion. The magnetic positioning assembly comprises at least one first magnet disposed in the connecting base, at least one second magnet disposed in the connecting bracket, and at least one third magnet disposed in the adapter base. A magnetic pole of the at least one first magnet is opposite to a magnetic pole of the at least one second magnet and a magnetic pole of the at least one third magnet, so the at least one first magnet is alternatively magnetically connected to the at least one second magnet and the at least one third magnet.

Furthermore, the auxiliary shooting device further comprises an aligning assembly, and the aligning assembly is configured for positioning the connecting bracket relative to the connecting base when the connecting base is connected to the connecting bracket.

Furthermore, the aligning assembly comprises a positioning protrusion and a positioning groove. The positioning protrusion is disposed on the connecting base. The positioning groove is disposed in the connecting bracket.

Furthermore, the auxiliary shooting device further comprises a fixing piece. The fixing piece is rotatably connected to the telescopic rod. The connecting base and the telescopic rod are fastened by the fixing piece.

Furthermore, the connecting bracket comprises a supporting arm rotatably connected to the clamping portion. A damping piece is disposed on a rotating joint between the supporting arm and the clamping portion. The locking grooves of the connecting bracket are defined in the supporting arm.

Furthermore, the clamping portion comprises flexible cushioning pads. The flexible cushioning pads are respectively disposed on clamping arms of the clamping portion.

Furthermore, the clamping portion comprises a flash connecting groove.

Furthermore, the handheld portion comprises supporting feet and connecting rods. The supporting feet are capable of being folded on the telescopic rod or unfolded relative to the telescopic rod. A first end of each of the connecting rods is rotatably connected to a corresponding one of the supporting feet. A second end of each of the connecting rods is rotatably connected to one end of the telescopic rod away from the connecting base.

Furthermore, the elastic retaining pieces are torsion springs.

In a second aspect, the present disclosure provide the auxiliary shooting device for the mobile device. The auxiliary shooting device comprises a telescopic rod, a connecting base, a connecting bracket, a locking switch assembly, and a magnetic positioning assembly. The telescopic rod comprises a handheld portion. The connecting base is connected to one end of the telescopic rod away from the handheld portion. The connecting bracket comprises locking grooves and a clamping portion configured to clamp the mobile device. The locking switch assembly comprises elastic retaining pieces and locking pieces rotatably connected to the connecting base. Each of the locking pieces comprises a pressing portion and a hook portion. When each pressing portion is pressed, each of the elastic retaining pieces is compressed, and the hook portion of each of the locking pieces moves away from the connecting base.

The locking pieces are respectively matched with the locking grooves of the connecting bracket. A first end of each of the elastic retaining pieces abuts against a corresponding one of the locking pieces. A second end of each of the elastic retaining pieces abuts against the connecting base. The connecting base and the connecting bracket are connected and locked with each other through the locking grooves of the connecting bracket and the locking pieces. The magnetic positioning assembly comprises at least one first magnet disposed in the connecting base and at least one second magnet disposed in the connecting bracket. A magnetic pole of the at least one first magnet is opposite to a magnetic pole of the at least one second magnet, so the at least one first magnet is magnetically connected to the at least one second magnet.

Compared with the prior art, in the auxiliary shooting device of the present disclosure, the mobile device is quickly mounted on the telescopic rod and quickly separated from the telescopic rod through the locking switch assembly, avoiding a time-consuming and inconvenient disassembly of the mobile device from the clamping portion and avoiding repeated retraction and extension of the telescopic rod.

Figure 1:
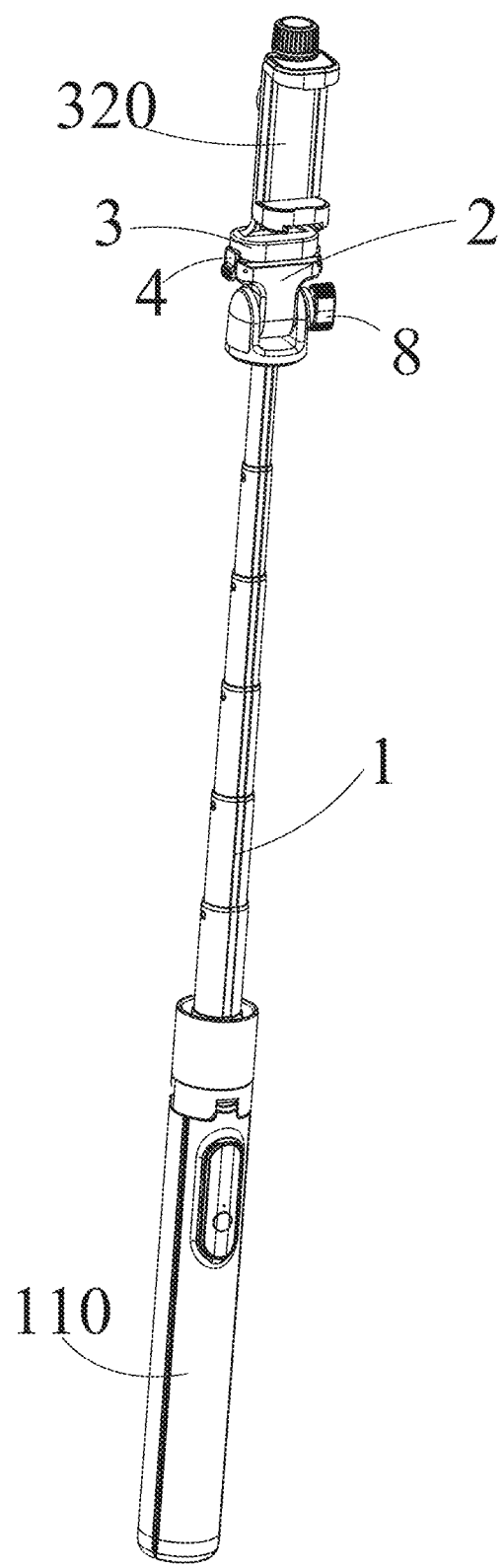
FIG. 1 is a schematic diagram of an auxiliary shooting device for a mobile device of the present disclosure where a telescopic rod is in an extended date.
Figure 2:
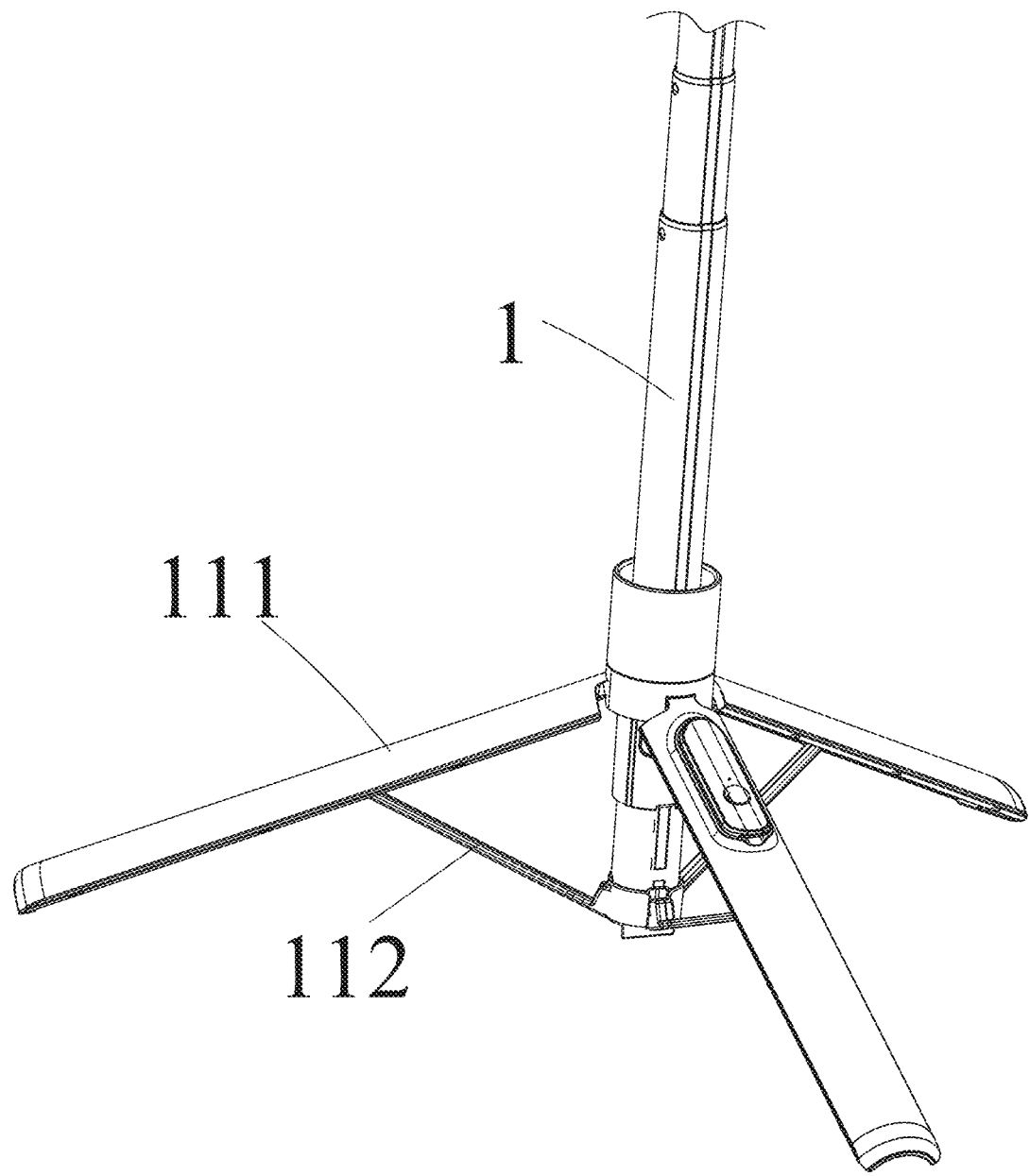
FIG. 2 is a schematic diagram of the auxiliary shooting device for the mobile device of the present disclosure where a handheld portion is in an unfolded date.
Figure 3:
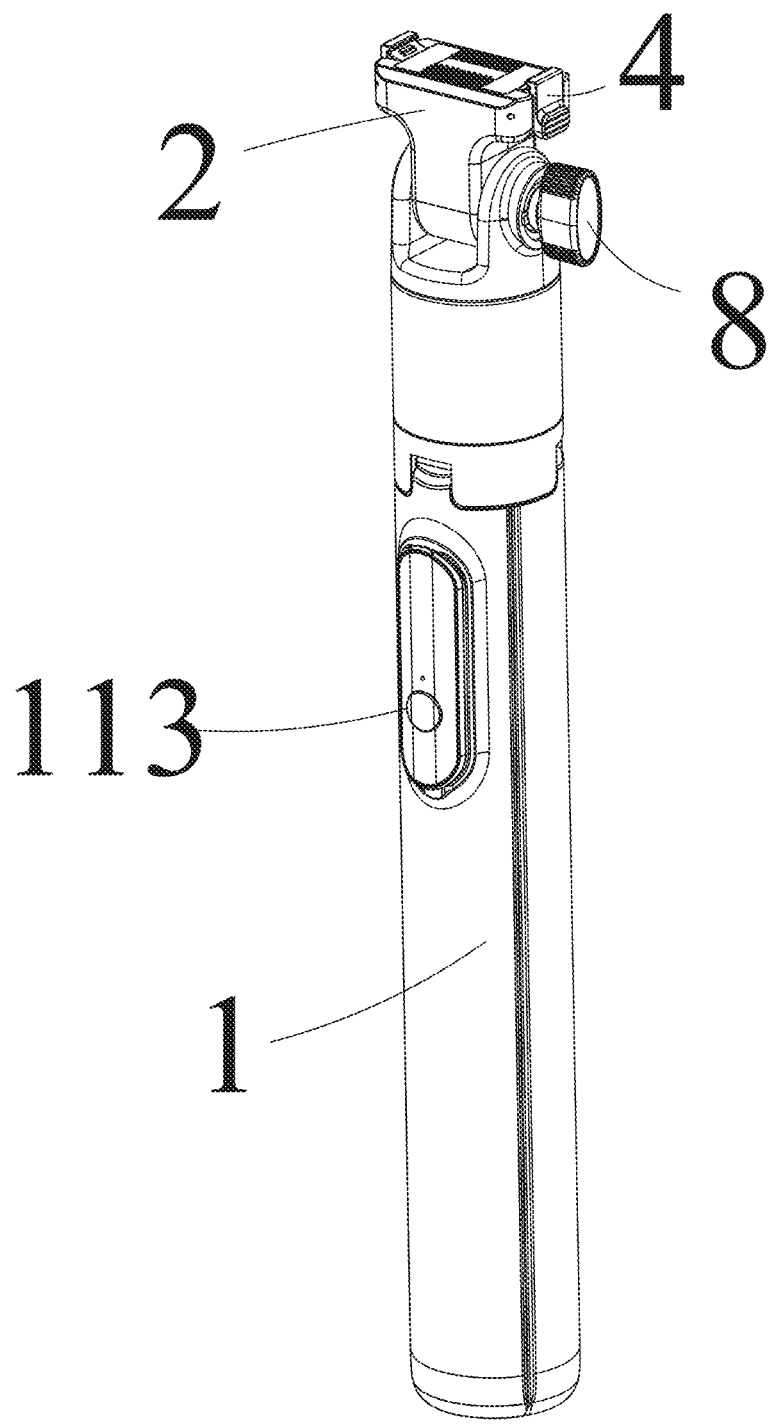
FIG. 3 is a schematic diagram of the auxiliary shooting device for the mobile device of the present disclosure where the telescopic rod is in a retracted date.

1—telescopic rod; 110—handheld portion; 111—supporting feet; 112—connecting rod; 113—control button; 2—connecting base; 3—connecting bracket; 310—locking groove of the connecting bracket; 320—clamping portion; 3212—flash connecting groove; 326—flexible cushioning pad; 330—supporting arm; 4—locking switch assembly; 410—elastic retaining piece; 420—locking piece; 421—pressing portion; 422—hook portion; 510—positioning protrusion; 520—positioning groove; 61—first magnet; 62—second magnet; 63—third magnet; 7—adapter base; 710—connecting piece; 720—accommodation portion; 711—4/1 screw head; 712—rotating wheel; 730—locking groove of the adapter base; 8—fixing piece.

DETAILED DESCRIPTION

Technical solutions in the embodiments of the present disclosure will be clearly and completely described below in conjunction with the accompanying drawings in the embodiments of the present disclosure. Obviously, the described embodiments are only a part of the embodiments of the present disclosure, rather than all of the embodiments. Based on the embodiments of the present disclosure, all other embodiments obtained by those of ordinary skill in the art without creative work shall fall within the protection scope of the present disclosure. It is understood that the drawings are only provided for reference and illustration, and are not used to limit the present disclosure. The connection relationship shown in the drawings is only for the convenience of clear description, and does not intend to limit the connection mode.

It should be noted that when a component is considered to be "connected" to another component, it can be directly connected to another component, or there may be a centered component at the same time. Unless otherwise defined, all technical and scientific terms used herein have the same meaning as commonly understood by those skilled in the art of the present disclosure. It should be noted in the description of the present disclosure that, unless otherwise regulated and defined, terms such as "installation", "bonded", and "connection" shall be understood in broad sense, and for example, may refer to fixed connection or detachable connection or integral connection; may refer to mechanical connection or electrical connection, and may refer to direct connection or indirect connection through an intermediate medium or inner communication of two elements. For those of ordinary skill in the art, the meanings of the above terms in the present disclosure may be understood according to concrete conditions.

In addition, it should be noted that in the description of the present disclosure terms such as "central", "horizontal", "upper", "lower", "left", "right", "vertical", "horizontal", "top", "bottom", "inner", "outer", etc. indicate direction or position relationships shown based on the drawings, and are only intended to facilitate the description of the present disclosure and the simplification of the description rather than to indicate or imply that the indicated device or element must have a specific direction or constructed and operated in a specific direction, and therefore, shall not be understood as a limitation to the present disclosure. In addition, terms such as "first", "second", and "third" are only used for the purpose of description, rather than being understood to indicate or imply relative importance.

As shown in FIGS. 1-8, the present disclosure provides an auxiliary shooting device for a mobile device. The auxiliary shooting device comprises a telescopic rod 1, a connecting base 2, a connecting bracket 3, a locking switch assembly 4, and a magnetic positioning assembly. The telescopic rod 1 comprises a handheld portion 110. The connecting base 2 is connected to one end of the telescopic rod 1 away from the handheld portion 110. The connecting bracket 3 comprises locking grooves 310 and a clamping portion 320 configured to clamp the mobile device. The locking switch assembly 4 comprises elastic retaining pieces 410 and locking pieces 420 rotatably connected to the connecting base 2. Each of the locking pieces 420 comprises a pressing portion 421 and a hook portion 422. When each pressing portion 421 is pressed, each of the elastic retaining pieces 410 is compressed, and the hook portion 422 of each of the locking pieces 420 is rotated to move away from the connecting base 2. The locking pieces 420 are respectively matched with the locking grooves 310. A first end of each of the elastic retaining pieces 410 abuts against a corresponding one of the locking piece 420. A second end of each of the elastic retaining pieces 410 abuts against the connecting base 2. The connecting base 2 and the connecting bracket 3 are connected and locked with each other through the locking grooves 310 and the locking pieces 420.

The magnetic positioning assembly comprises at least one first magnet 61 disposed in the connecting base 2 and at least one second magnet 62 disposed in the connecting bracket 3. A magnetic pole of the at least one first magnet 61 is opposite to a magnetic pole of the at least one second magnet 62, so the at least one first magnet 61 is magnetically connected to the at least one second magnet 62. In one optional embodiment, the at least one first magnet 61 comprises two first magnets 61 that are symmetrically disposed, and the at least one second magnet 62 comprises two second magnets 62 that are symmetrically disposed.

By arrangement of the first magnets 61 and the second magnets 62, the connecting base 2 and the connecting bracket 3 are automatically positioned and magnetically connected to each other when the connecting base 2 and the connecting bracket 3 are aligned for assembling, so as to achieve a quick and hands-free assembly. Therefore, the connecting base 2 and the connecting bracket 3 do not need to be manually connected to screws and nuts like a connecting base and a connection bracket 3 in the prior art. Because the mobile device, such as a mobile phone, a sports camera, or a small camera, which is connected to the clamping portion 320 or the adapter base 7, is relatively complicated and large in size, it is awkward and difficult to manually connecting the connecting base and the connecting bracket in the prior art with the screws and nuts.

Optionally, the number of the locking grooves 310 is two, and the locking grooves 310 are symmetrically disposed.

In some embodiments, a control button 113 is disposed on the handheld portion 110, and the control button 113 is wiredly or wirelessly connected to the mobile device.

A working principle of the auxiliary shooting device is as follows. The mobile device is first clamped in the clamping portion 320 by a user, then the telescopic rod 1 is opened and extended, the handheld portion 110 is hold by the use, and the auxiliary shooting device and the mobile device are lifted for shooting. After photos or videos are taken, the user does not need to compress and shorten the telescopic rod 1, but holds the mobile device in front of the body, presses each pressing portion 421 with fingers, so that each of the locking pieces 420 rotates relative to the connecting base 2, each of the elastic retaining pieces 410 is compressed, and each hook portion 422 is separated from each of the locking grooves 310. Therefore, the connecting bracket 3 is separated from the connecting base 2. At this time, the user is allowed to hold the mobile device and the connecting bracket 3 alone, and the telescopic rod 1 is placed vertically beside the user to prevent the telescopic rod 1 from being placed horizontally and affecting people around.

Meanwhile, since the telescopic rod 1 is indirectly connected to the mobile device, after separation, the user is allowed to hold the mobile device and the connecting bracket 3 separately, which is labor-saving when the user browses works shot by the mobile device. When the user needs to continue to use the telescopic rod 1 for shooting, the user is able to press each pressing portion 421 by the fingers, and each of the locking pieces 420 rotates relative to the connecting base 2. Therefore, each of the elastic retaining pieces 410 is compressed, and each hook portion 422 is limited. At this time, the connecting base 2 and the connecting bracket 3 are docked, and each hook portion 422 is aligned with a corresponding one of the locking grooves s310. Then, the user is able to release the fingers to release each pressing portion 421. Under an elastic force of each of the elastic retaining pieces 410, the first end of each of the elastic retaining pieces 410 abuts against the corresponding one of the locking pieces 420, and the second end of each of the elastic retaining pieces 410 abuts against the connecting base 2, so that the connecting base 2 is connected and locked with the connecting bracket 3 through the locking grooves s310 and the locking pieces 420. There is no need to fold or unfold the telescopic rod 1 during a shooting and browsing process, and the connecting base 2 and the connecting bracket 3 are convenient and quick to assemble and disassemble.

In the auxiliary shooting device of the present disclosure, the mobile device is quickly mounted on the telescopic rod 1 and quickly separated from the telescopic rod 1 through the locking switch assembly 4, avoiding a time-consuming and inconvenient disassembly of the mobile device from the clamping portion 320 and avoiding repeated retraction and extension of the telescopic rod 1.

Figure 4:
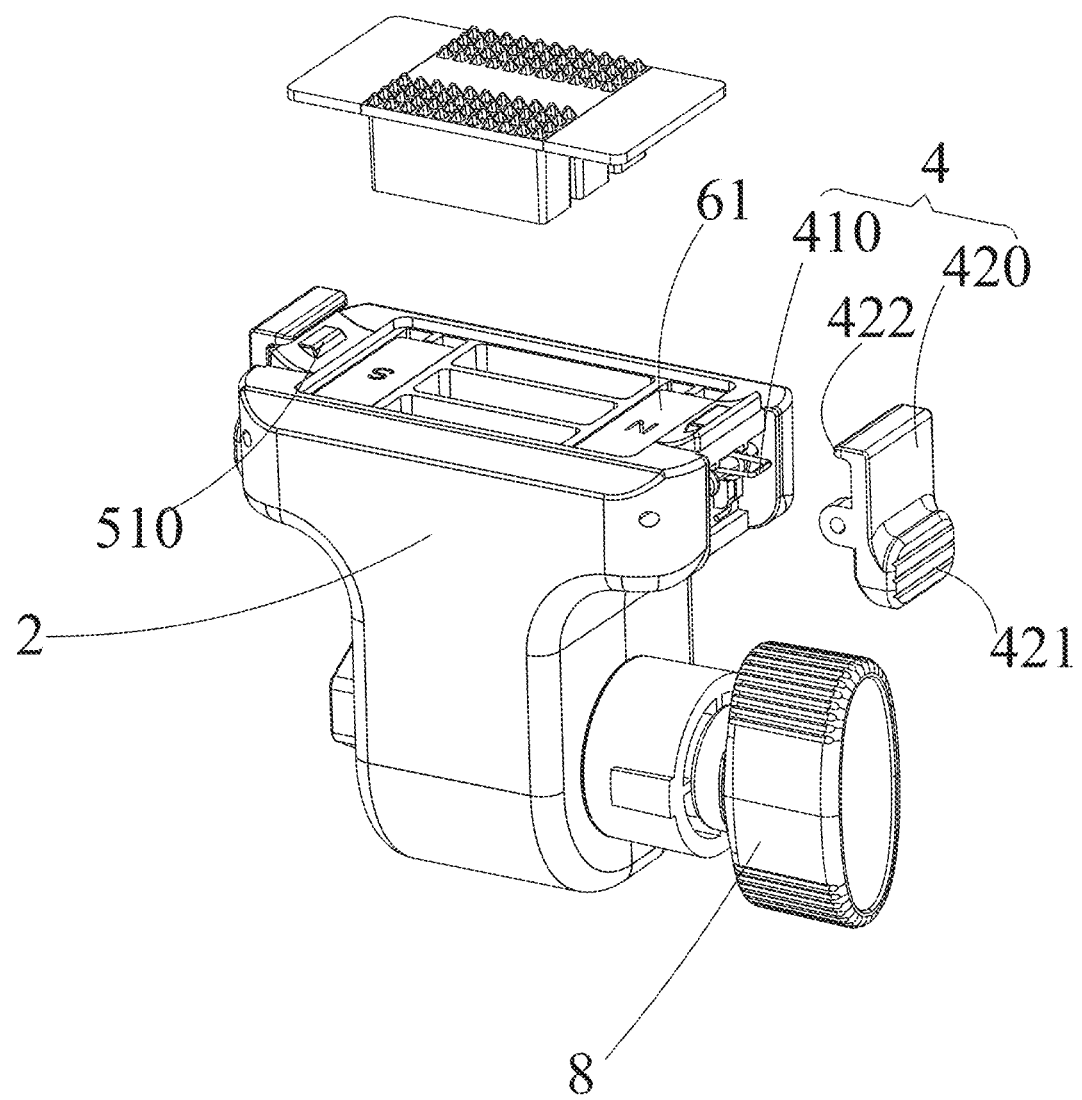
FIG. 4 is an exploded schematic diagram of a connecting base of the auxiliary shooting device for the mobile device of the present disclosure.
Figure 5:
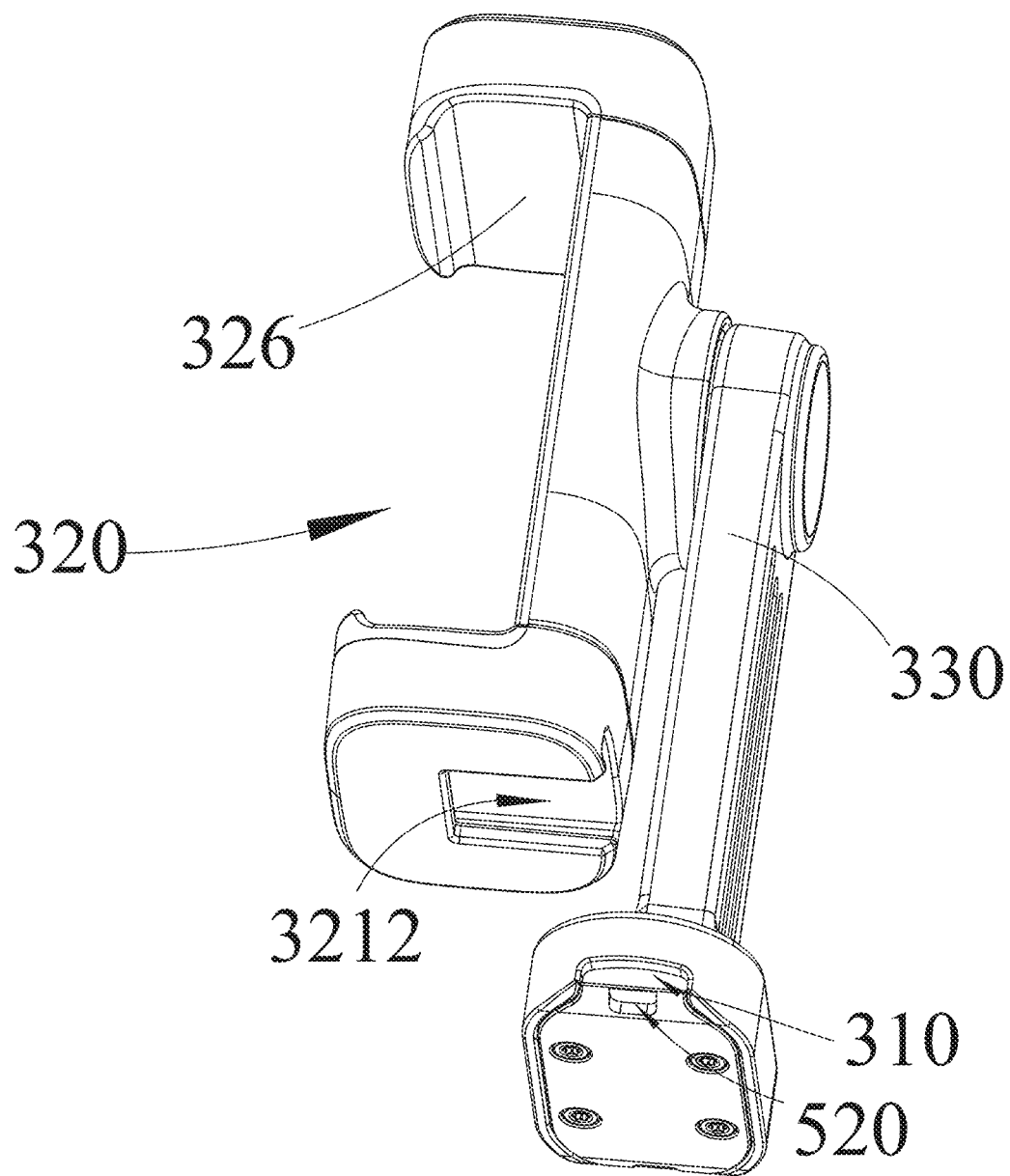
FIG. 5 is a schematic diagram of a connecting bracket of the auxiliary shooting device for the mobile device of the present disclosure.

As shown in FIGS. 4-5, the auxiliary shooting device further comprises an aligning assembly, and the aligning assembly is configured for positioning the connecting bracket 3 relative to the connecting base 2 when the connecting base 2 is connected to the connecting bracket 3.

In some embodiment, the aligning assembly comprises a positioning protrusion 510 and a positioning groove 520. The positioning protrusion 510 is disposed on the connecting base 2. The positioning groove 520 is disposed in the connecting bracket 3. The aligning assembly well guide the user to position and connect the locking pieces and the locking grooves in place.

As shown in FIG. 4, the magnetic positioning assembly comprises two first magnets 61 disposed in the connecting base 2 and two second magnets 62 disposed in the connecting bracket 3.

By arrangements of the first magnets 61 and the second magnets 62, an ease of operation is improved when the user operates the mobile device through disassembling the connecting bracket 3 from the connecting base 2.

As shown in FIGS. 1 and 4, the auxiliary shooting device further comprises a fixing piece 8. The fixing piece 8 is rotatably connected to the telescopic rod 1. The connecting base 2 and the telescopic rod 1 are fastened by the fixing piece 8.

In some embodiments, the fixing piece 8 is a hand screw or a nut set, and the connecting base 2 is hingedly connected to the telescopic rod 1.

Figure 6:
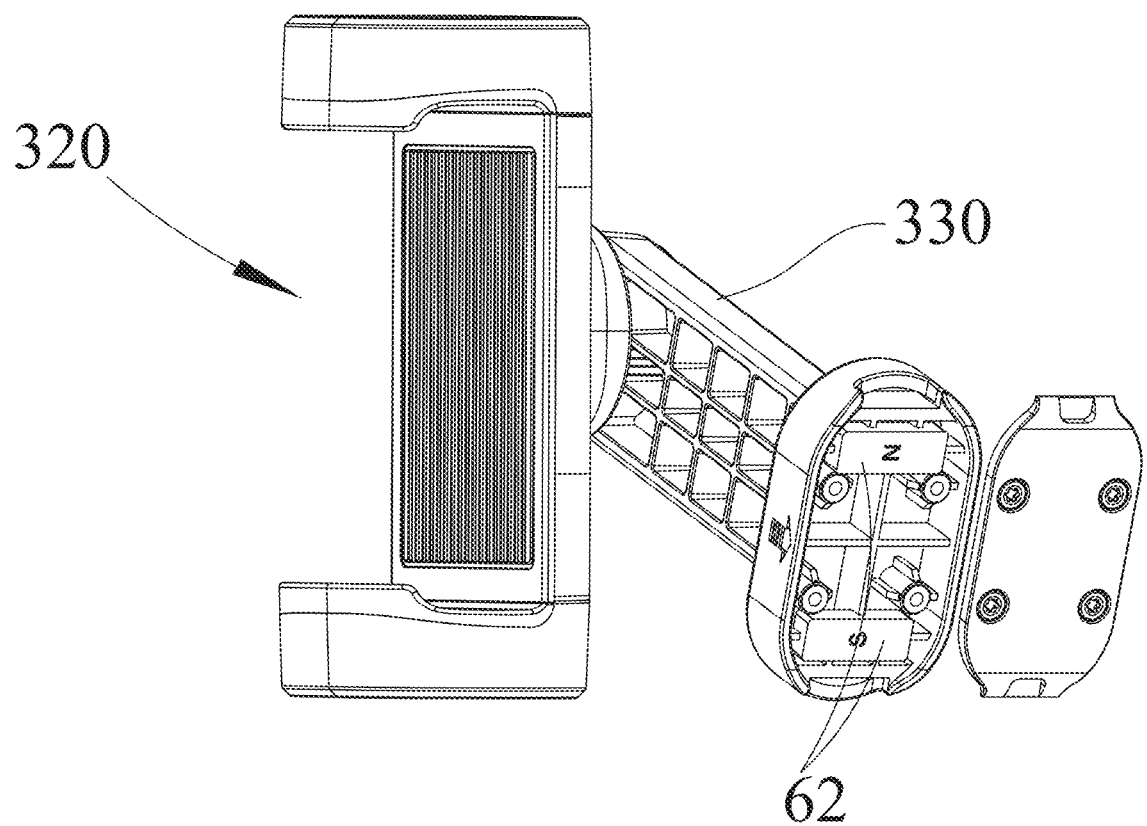
FIG. 6 is an exploded schematic diagram of the connecting bracket of the auxiliary shooting device for the mobile device of the present disclosure.

As shown in FIGS. 5 and 6, in some embodiments, the clamping portion 320 may be an elastic clamp, or a clamping structure in which a clamping tightness thereof is adjusted by screws or nuts.

As shown in FIGS. 5 and 6, the clamping portion 320 comprises flexible cushioning pads 326. The flexible cushioning pads 326 are respectively disposed on clamping arms of the clamping portion 320. The clamping portion 320 comprises a flash connecting groove 3212.

The flexible cushioning pads 326 prevents the clamping portion 320 from scratching the mobile device.

Figure 7:
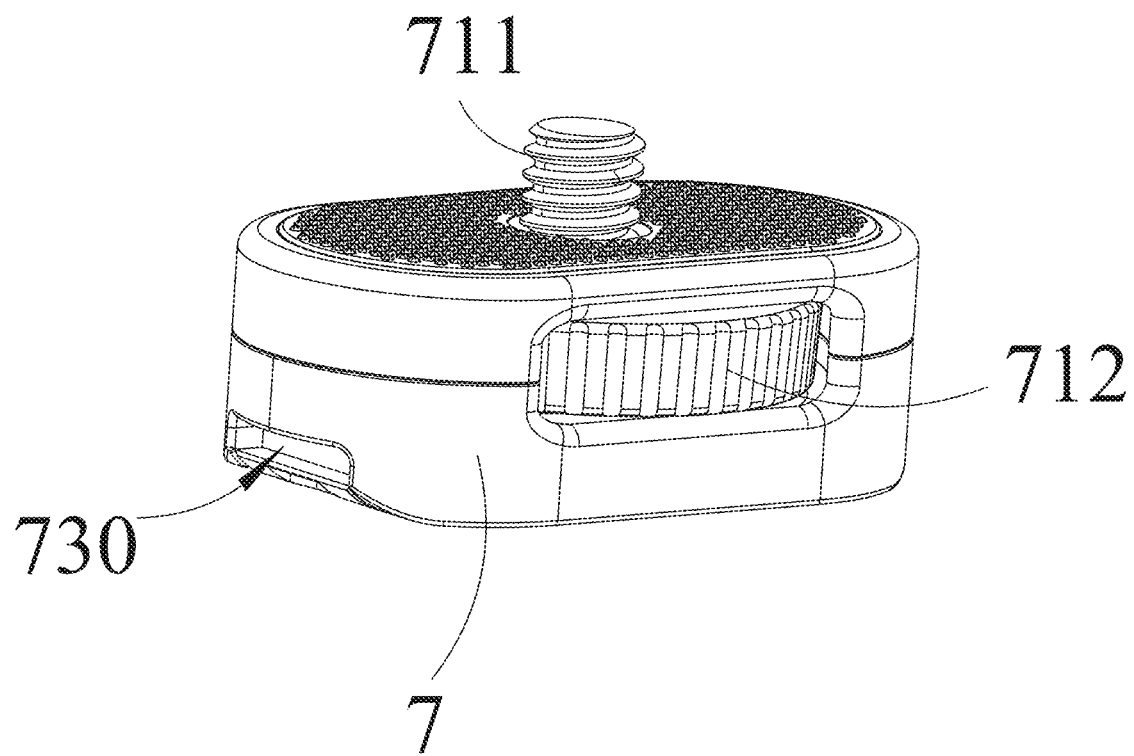
FIG. 7 is a schematic diagram of an adapter base of the auxiliary shooting device for the mobile device of the present disclosure.
Figure 8:
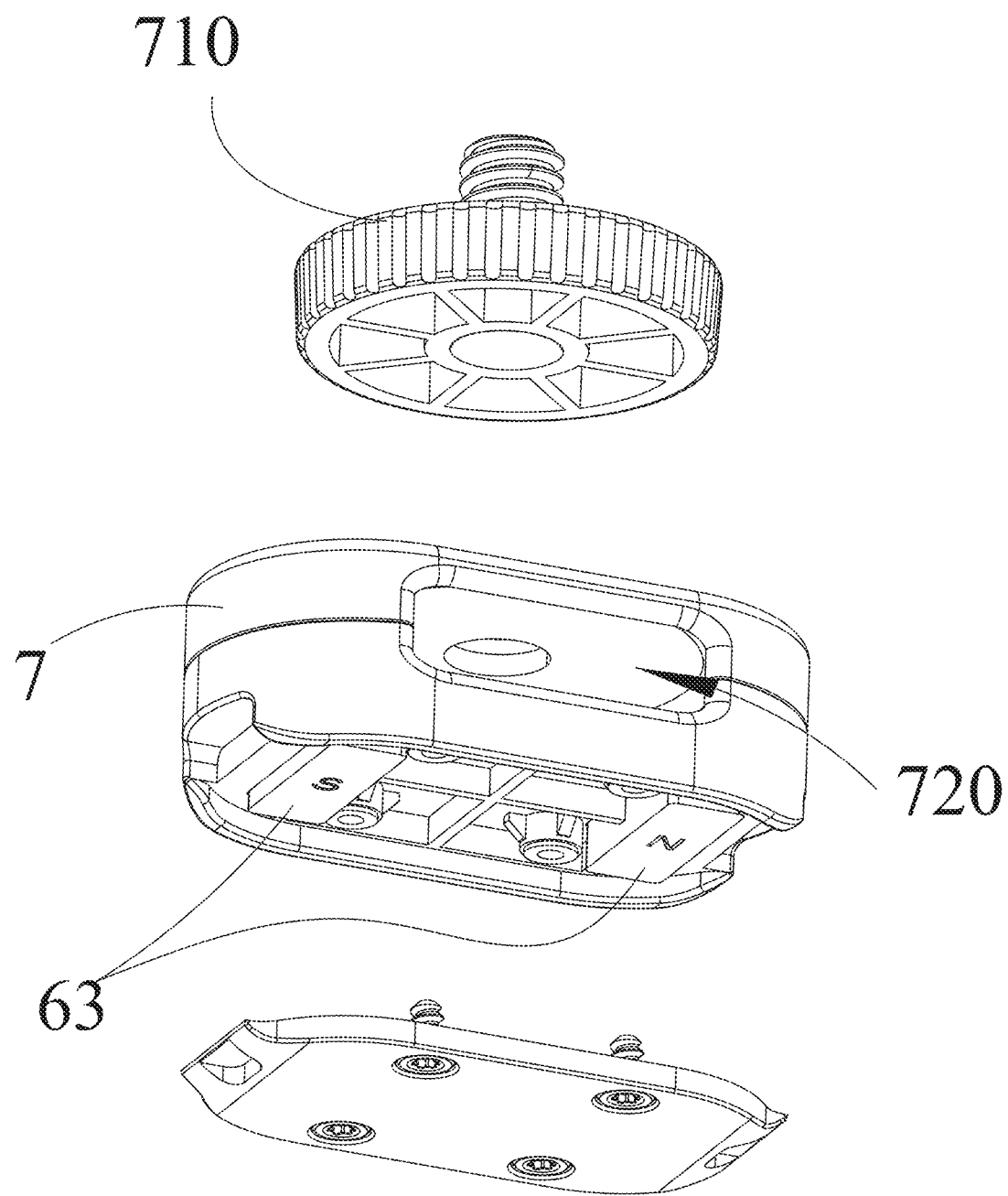
FIG. 8 is an exploded schematic diagram of the adapter base of the auxiliary shooting device for the mobile device of the present disclosure.

As shown in FIGS. 5, 7, and 8, the auxiliary shooting device further comprises an adapter base 7. The adapter base 7 comprises a connecting piece 710, an accommodating portion 720, and locking grooves 730. The connecting piece 710 comprises a 4/1 screw 711 and a rotating wheel 712. The 4/1 screw 711 extends out of an upper end surface of the adapter base 7. The rotating wheel 712 is disposed in the accommodating portion 720. The rotating wheel 712 is partially exposed from the accommodating portion 720 and an outer contour of the adapter base 7.

Furthermore, the connecting bracket 3 comprises a supporting arm 330 rotatably connected to the clamping portion 320. A damping piece (not shown in the drawings) is disposed on a rotating joint between the supporting arm 330 and the clamping portion 320. The locking grooves 310 of the connecting bracket 3 are defined in the supporting arm 330.

The 4/1 screw head 711 of the adapter base 7 is configured to connect to a 4/1 screw hole of a small camera or a sports camera, and the 4/1 screw head 711 is further configured to connect to other photographic equipment with the 4/1 screw hole. The 4/1 screw head 711 enables the telescopic rod 1 to be connected to the small camera, the sports camera, and other photographic equipment, thereby expanding use scenarios of the telescopic rod 1.

The number of the locking grooves 730 is two and are respectively matched with the locking pieces 420. The magnetic positioning assembly further comprises two third magnets 63 disposed in the adapter base 7. The third magnets 63 are disposed correspondingly to the first magnets 61 in the connecting base 2. In this way, the adapter base 7 is quickly disassembled and assembled with the connecting base 2 through the locking switch assembly 4. Therefore, the small camera or the sports camera is supported and adjusted through the telescopic rod 1.

The clamping portion 320 is rotatably connected to the supporting arm 330, so that the mobile device is rotatable along with the clamping portion 320, which expand an adjusting range of the mobile device. In addition, the damping piece enhances friction at a rotating joint between the clamping portion and the supporting arm, making it convenient for the user to adjust the clamping piece without the need for additional tools. Once the adjustment of the clamping portion is completed, positioning of the mobile device is completed, which is convenient and quick.

Furthermore, the handheld portion 110 comprises supporting feet 111 and connecting rods 112. The supporting feet 111 are capable of being folded on the telescopic rod 1 or unfolded relative to the telescopic rod 1. A first end of each of the connecting rods 112 is rotatably connected to a corresponding one of the supporting feet 111. A second end of each of the connecting rods 112 is rotatably connected to one end of the telescopic rod 1 away from the connecting base 2.

In this way, the handheld portion 110 is able to be held by the user, the telescopic rod 1 is configured as a selfie stick, and the supporting feet 111 are able to be unfolded to be configured as a tripod.

In the embodiment, the handheld portion 110 comprises three supporting feet 111 and three connecting rods 112. In other embodiments, the handheld portion 110 is not limited to being provided with three supporting feet 111 and three connecting rods 112, but may also have any number of the supporting feet and the connecting rods, such as one, two, four, five, or six.

In some embodiments, the elastic retaining pieces 410 are torsion springs.

In summary, the connecting base 2 on the telescopic rod 1 of the present disclosure is able to be quickly and conveniently disassembled and connected to the connecting bracket 3 with the second magnets 62 through pressing each pressing portion 421 on the locking switch assembly 4 and the magnetic attraction of the first sticker 61. The clamping portion 320 of the connecting bracket 3 clamps the mobile device. The connecting base 2 is alternatively connected to the adapter base 7 having the third magnets 63 through the locking switch assembly 4, which eliminates a slow connection operation of manually operating a hand screw in the prior art.

The 4/1 screw head 711 of the adapter base 7 is able to be connected to the 4/1 screw hole of the small camera or the 4/1 screw hole of the sports camera, so that the adapter base 7 has rich applications. In this way, the adapter base 7 is configured as a support if different types of shooting devices, eliminating a need to frequently replace various auxiliary shooting brackets, such as selfie sticks or tripods. Further, quick assembly and quick disassembly of the adapter base 7 improve a shooting experience of the user. The first magnets 61 of the connecting base 2 and the second magnets 62 of the connecting bracket 3 are magnetically connected for positioned to achieve quick assembly of the connecting base 2 and the connecting bracket 3, which is convenient for the user to operate. The first magnets 61 of the connecting base 2 and the third magnets 63 of the adapter base 7 are magnetically connected for positioned to achieve quick assembly of the connecting base 2 and the adapter base 7, which is convenient for the user to operate. Therefore, the auxiliary shooting device has multiple functions for mounting different types of shooting devices, so that the need to frequently change various sports camera stands/selfie sticks/tripods is eliminated.

In the specification and claims of the present disclosure, terms "include/comprise" and terms "have/contain" and their variants are used to designate existence of stated features, values, steps or components, but do not exclude the existence or addition of one or multiple other features, values, steps, components, or combinations thereof.

For clarity of explanation, some features of the present disclosure are described in different embodiments. However, these features can also be combined and described in a single embodiment. Moreover, some features of the present disclosure are only described in a single embodiment for the sake of brevity. However, these features can also be described in different embodiments separately or in any suitable combination.

Foregoing descriptions are only optional embodiments of the present disclosure and are not intended to limit the present disclosure. Any modification, equivalent replacement, or improvement within the technical scope of the present disclosure should be included in the protection scope of the present disclosure.

What is claimed is:

1. An auxiliary shooting device for a mobile device, comprising:
   a telescopic rod;
   a connecting base;
   a connecting bracket;
   a locking switch assembly;
   a magnetic positioning assembly; and
   an adapter base;
   wherein the connecting base is alternatively connected to the connecting bracket and the adapter base, the telescopic rod comprises a handheld portion, the connecting base is connected to one end of the telescopic rod away from the handheld portion, the connecting bracket comprises locking grooves and a clamping portion configured to clamp the mobile device, the locking switch assembly comprises elastic retaining pieces and locking pieces, the locking pieces are rotatably connected to the connecting base, and each of the locking pieces comprises a pressing portion and a hook portion;

wherein when each pressing portion is pressed, each of the elastic retaining pieces is compressed, and the hook portion of each of the locking pieces moves away from the connecting base;

wherein the locking pieces are respectively matched with the locking grooves, a first end of each of the elastic retaining pieces abuts against a corresponding one of the locking pieces, a second end of each of the elastic retaining pieces abuts against the connecting base, and the connecting base and the connecting bracket are connected and locked with each other through the locking grooves and the locking pieces;

wherein the adapter base comprises a connecting piece, an accommodating portion, and locking grooves; wherein the connecting piece comprises a 4/1 screw and a rotating wheel, the 4/1 screw extends out of an upper end surface of the adapter base, and the rotating wheel is disposed in the accommodating portion;

wherein the magnetic positioning assembly comprises at least one first magnet disposed in the connecting base, at least one second magnet disposed in the connecting bracket, and at least one third magnet disposed in the adapter base; wherein a magnetic pole of the at least one first magnet is opposite to a magnetic pole of the at least one second magnet and a magnetic pole of the at least one third magnet, so the at least one first magnet is alternatively magnetically connected to the at least one second magnet and the at least one third magnet.

2. The auxiliary shooting device according to claim 1, wherein the auxiliary shooting device further comprises an aligning assembly, and the aligning assembly is configured for positioning the connecting bracket relative to the connecting base when the connecting base is connected to the connecting bracket.

3. The auxiliary shooting device according to claim 2, wherein the aligning assembly comprises a positioning protrusion and a positioning groove, the positioning protrusion is disposed on the connecting base, and the positioning groove is disposed in the connecting bracket.

4. The auxiliary shooting device according to claim 1, wherein the auxiliary shooting device further comprises a fixing piece, the fixing piece is rotatably connected to the telescopic rod, and the connecting base and the telescopic rod are fastened by the fixing piece.

5. The auxiliary shooting device according to claim 1, wherein the connecting bracket comprises a supporting arm rotatably connected to the clamping portion, a damping piece is disposed on a rotating joint between the supporting arm and the clamping portion, and the locking grooves of the connecting bracket are defined in the supporting arm.

6. The auxiliary shooting device according to claim 1, wherein the clamping portion comprises flexible cushioning pads, and the flexible cushioning pads are respectively disposed on clamping arms of the clamping portion.

7. The auxiliary shooting device according to claim 1, wherein the clamping portion comprises a flash connecting groove.

8. The auxiliary shooting device according to claim 1, wherein the handheld portion comprises supporting feet and connecting rods, and the supporting feet are capable of being folded on the telescopic rod or unfolded relative to the telescopic rod, a first end of each of the connecting rods is rotatably connected to a corresponding one of the supporting feet, and a second end of each of the connecting rods is rotatably connected to one end of the telescopic rod away from the connecting base.

9. The auxiliary shooting device according to claim 1, wherein the elastic retaining pieces are torsion springs.

10. An auxiliary shooting device for a mobile device, comprising:
- a telescopic rod;
- a connecting base;
- a connecting bracket;
- a locking switch assembly; and
- a magnetic positioning assembly;

wherein the telescopic rod comprises a handheld portion, the connecting base is connected to one end of the telescopic rod away from the handheld portion, the connecting bracket comprises locking grooves and a clamping portion configured to clamp the mobile device, the locking switch assembly comprises elastic retaining pieces and locking pieces, the locking pieces are rotatably connected to the connecting base, and each of the locking pieces comprises a pressing portion and a hook portion;

wherein when each pressing portion is pressed, each of the elastic retaining pieces is compressed, and the hook portion of each of the locking pieces moves away from the connecting base;

wherein the locking pieces are respectively matched with the locking grooves of the connecting bracket, a first end of each of the elastic retaining pieces abuts against a corresponding one of the locking pieces, a second end of each of the elastic retaining pieces abuts against the connecting base, and the connecting base and the connecting bracket are connected and locked with each other through the locking grooves of the connecting bracket and the locking pieces;

wherein the magnetic positioning assembly comprises at least one first magnet disposed in the connecting base and at least one second magnet disposed in the connecting bracket, and a magnetic pole of the at least one first magnet is opposite to a magnetic pole of the at least one second magnet, so the at least one first magnet is magnetically connected to the at least one second magnet.

* * * * *